United States Patent
LaViola

[19]

[11] Patent Number: 5,943,175
[45] Date of Patent: Aug. 24, 1999

[54] COMBINATION REAR VIEWING APPARATUS FOR HUNTERS AND WIND GAUGE

[76] Inventor: James A. LaViola, Rd. #6, Box 6638, East Stroudsburg, Pa. 18301

[21] Appl. No.: 08/992,660

[22] Filed: Dec. 17, 1997

[51] Int. Cl.$^6$ .............................. G02B 7/182; G02B 5/08; A47F 1/14; A63B 53/00
[52] U.S. Cl. .......................... 359/871; 359/855; 248/466; 73/170.05
[58] Field of Search ..................................... 359/838, 871, 359/872, 855, 865, 875, 881; 248/466; 73/170.05

[56] References Cited

U.S. PATENT DOCUMENTS

| | | | |
|---|---|---|---|
| 4,004,850 | 1/1977 | Nelson | 359/855 |
| 4,487,479 | 12/1984 | Tolomeo, Sr. | 359/854 |
| 4,750,811 | 6/1988 | Beyer | 359/602 |
| 4,856,888 | 8/1989 | Wahl | 359/881 |
| 5,186,118 | 2/1993 | Stinson | 116/214 |
| 5,291,778 | 3/1994 | Dexheimer et al. | 73/170.05 |
| 5,383,061 | 1/1995 | Lanier | 359/872 |
| 5,400,183 | 3/1995 | Rosser | 359/872 |

Primary Examiner—Cassandra Spyrou
Assistant Examiner—Mark A. Robinson
Attorney, Agent, or Firm—Sanford J. Piltch

[57] ABSTRACT

A combination rearward viewing and wind gauge comprising a base member having a plurality of mounting holes and being conformable to the shape of a substantially rigid underlying support surface, an elongated shaft for supporting a holder for at least one mirror and a flexible line for determining wind direction and movement, the elongated shaft being substantially perpendicular to an outer facing surface of the base member and attached to the base member and to the holder for the at least one mirror being attached to the elongated shaft at its distal end. The elongated shaft is bendable over its entire length to selected positions with the capability to remain in said selected positions. The combination also includes a flexible hinge conjoining adjacent sections of the mirror holder with each section containing a mirror and being separately angularly adjustable such that the sections may be selectively positioned to align each of the faces of the mirrors in a relative angular displacement which varies over the range of 0° to 180°. The flexible line has a weight and size so as to be displaceable from its rest position by air movement showing said air movement by the direction of the displacement.

10 Claims, 3 Drawing Sheets

COMBINATION REAR VIEWING APPARATUS FOR HUNTERS AND WIND GAUGE

BACKGROUND OF THE INVENTION

The present invention relates generally to apparatus providing rear and side vision for hunters without the need for the hunter to move in order to view what is either behind or aside, or above or below, the hunter while oriented in a given direction. The present invention combines with the apparatus for providing views in one or more directions a wind gauge so that the hunter can instantaneously determine wind direction by observing the apparatus.

Although there have been earlier mirror devices for providing a rear view to a hunter, which devices are adjustable and compact, these devices were difficult to mount and not readily adaptable to mount on a variety of surfaces. One such device is the multiple section rear viewing mirror of U.S. Pat. No. 4,487,479 [Tolomeo, Sr.] which is strappable around a vertically standing cylindrical object, such as a tree. Each of the two side mirror sections are adjustable in angular rotation about a hinge point to the central mirror section which is adjacent to the common sides of the mirror sections. Also, the central mirror section is pivotable about four (4) points, or fingers, which set the central mirror portion off from the vertical support surface of the object so that the central mirror section can be fixedly positioned in both the horizontal and vertical directions by adjusting each of the fingers inward or outward, respectively, to the object. The problem with this apparatus is it only mounts to a vertically standing cylindrical object, such as a tree, and not to any other object or surface. This relegates the hunter to facing, or partially facing the tree such that the tree is in a direct line of sight and will substantially interfere with aiming a weapon to take down whatever game is being hunted.

Another rearward viewing apparatus is disclosed in U.S. Pat. No. 5,383,061 [Lanier] which describes an apparatus for use by hunters while seated in a tree stand. The device may be described as a rearview mirror similar to one used in automobiles having a bracket arm attachable to a vertically standing substantially cylindrical objection, such as a tree or a pole, to which the tree stand is attached. As with the previously described apparatus, the device of the Lanier patent describes only attachment to the tree or pole which necessitates the hunter facing the tree or pole to utilize the mirror to provide a field of vision behind the hunter. Again, this necessitates the tree or pole falling within the line of sight of whatever weapon is being utilized by the hunter to take down the game sought and will interfere with the same while tracking the game across the field of view.

It is an object of the present invention to provide a rearward viewing apparatus enabling the hunter to have a field of vision away from the forward facing position of the hunter's head, where such apparatus has a base which is mountable to any surface regardless of size or shape.

It is another object of the present invention to provide a mirror apparatus having an elongated arm connected between its base and the mirror which is omni-directionally positionable and of sufficient length so that the hunter can position himself with his back to the object supporting the base so that he has an uninterrupted forward field of vision.

It is a further object of the present invention to also provide a bi-sectional mirror device which may be secured by a base to any surface and supported at a distance from the base by an omni-directionally positionable elongated arm so that one section of the mirror provides one field of view in a direction away from the front facing view of the hunter and the other section of the mirror provides a different field of view also facing away from the front facing view of the hunter.

It is still a further object of the present invention to provide a wind gauge in combination with the mirror apparatus so that the hunter is reliably informed as to the wind direction instantaneously upon viewing the gauge.

Other objects will appear hereinafter.

SUMMARY OF THE INVENTION

A combination rearward viewing and wind gauge apparatus will be described as comprising a base member having a plurality of mounting holes and being conformable to the shape of a substantially rigid underlying support surface, an elongated shaft for supporting a means for holding at least one mirror and a means for determining wind direction and movement, a means for retaining and supporting the elongated shaft substantially perpendicular to an outer facing surface of the base member and attached being to the base member, with the means for holding the at least one mirror being attached in perpendicular arrangement to the elongated shaft at the distal end of the elongated shaft. Further, the elongated shaft is bendable over its entire length to selected positions with the capability to remain in these selected positions. The combination further comprises a flexible hinge conjoining adjacent sections of the mirror holding means with each section containing a mirror and being separately angularly adjustable one section to the other. The flexible hinge may be selectively positioned to align each of the faces of the mirrors in a relative angular displacement which varies over the range of 0° to 180°. The means for determining wind direction and movement is a flexible line having a weight and size so as to be displaceable from its rest position by air movement showing said air movement by the direction of the displacement. The combination may exclude the base and be mountable directly into a naturally occurring support surface.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 4a is a top view of FIG. 4.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
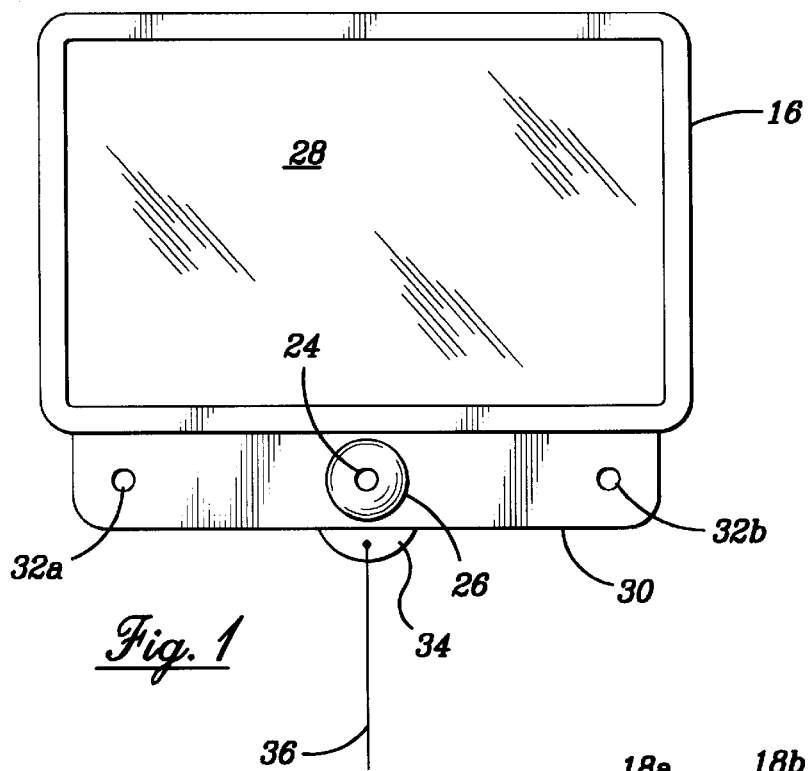
FIG. 1 is a front plan view of a first embodiment of the rearward field of vision mirror apparatus of the present invention showing the mirror, mirror holder and wind gauge.
Figure 2:
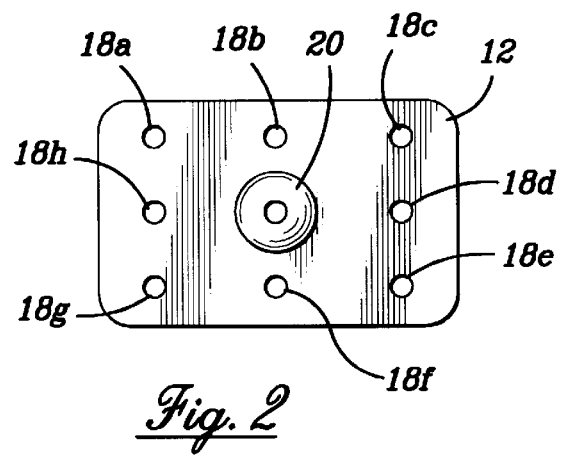
FIG. 2 is a plan view of the universal base for the rearward field of vision apparatus of the present invention.
Figure 3:
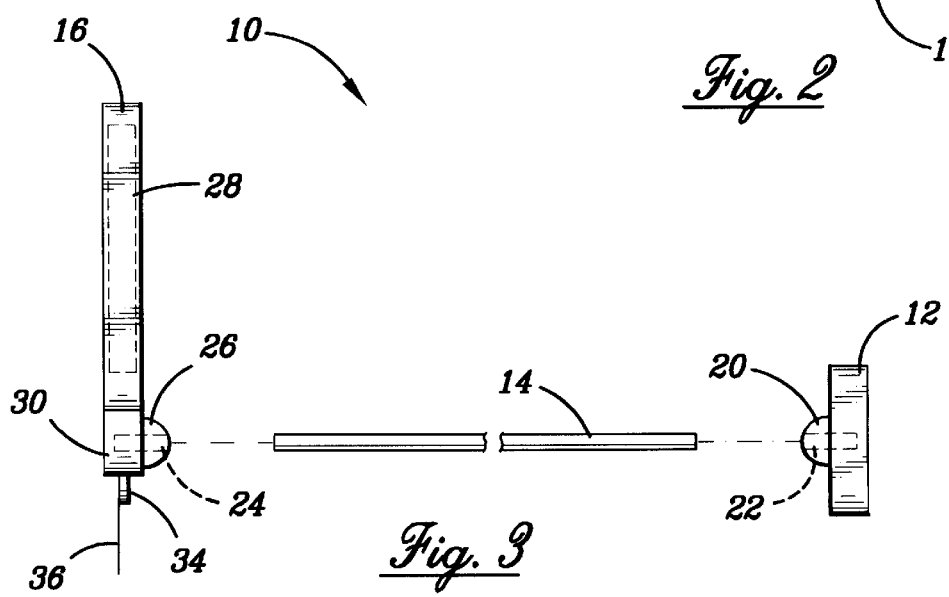
FIG. 3 is an exploded side view of the rearward field of vision apparatus of the present invention showing the mirror holder, mirror and wind gauge, the elongated arm, and the base.

Referring now to the drawings in detail, where like numerals refer to like parts or elements, there is shown in FIGS. 1–3 a first embodiment of the rearward field of vision mirror apparatus 10. The mirror apparatus 10 is comprised of three major elements, i.e. a base 12, an elongate arm 14 and a combination mirror holder 16.

With particular reference to FIGS. 2 and 3, the base 12 has a number of mounting holes 18a–18h arrayed symmetrically about the periphery of the base to provide a means for securing the base 12 to a rigid support. Located at the center of the base 12 is a shaft holder and support 20 having a central axially aligned opening 22 extending completely through the support 20 and downward through a portion of the base 12. The opening 22 through the support 20 and into the base 12 is dimensionally proportioned to receive the elongate arm or shaft 14 such that the fit is snug between the shaft 14 and the portions of the support 20 and base 12 surrounding the opening 22. Use of the mounting holes 18a–18h of the base 12 will be described in greater detail hereinafter.

The elongate arm or shaft 14 has a length which has a preferred length varying from approximately 12" to approximately 30" so that the combination mirror holder 16, which is attached to its distal end, is positioned a distance of between 1 foot and 2½ feet away from the support to which the base 12 is attached. The proximal end of the arm or shaft 14 is inserted into the opening 22 of the support 20 and base 12. The arm or shaft 14 has a diameter of between 0.25" and 0.375" and is made of a material which is bendable to achieve a selected position for the mirror holder 16, yet sufficiently strong so as to maintain the desired position selected by the hunter. Further, the arm or shaft 14 can either be inserted into an opening 24 in a shaft holder and support 26 identical in size and dimension to the shaft holder and support 20, where such opening extends completely through the support 26 and into the mirror holder 16. As in the case of the proximal end of the shaft 14 fitting snugly into the opening 22 in the base 12, the distal end of the shaft also snugly fits within the opening 24 and frictionally engages the portions of the support 26 and mirror holder 16 surrounding the opening 24. In addition, to augment the adjustability of the mirror holder 16, the opening 24 may extend completely through the mirror holder 16 so that the mirror holder 16 may be slidably adjustable along the shaft 14 either increasing or reducing the distance between the mirror holder 16 and the base 12 to enhance the field of vision of the hunter.

The cross-sectional configuration of the shaft 14, while preferred to be circular, may also be square or rectangular, so long as the capability of being bendable at any point to fix the position of the shaft 14 in any desired position is maintained. Of course, the shape of the openings 22, 24 in the base 12 and mirror holder 16, respectively, will likewise change to accommodate the change in shape of the shaft 14. As an alternate mounting, the shaft 14 may be placed directly into soft earth, or any other naturally occurring supportive material, obviating the need for the base 12, but permitting the use of the shaft 14 and mirror holder 16 as described herein.

Housed within the mirror holder 16 is a mirror 28 which may be press fitted into the mirror holder 16 or mounted into the mirror holder 16 by other means now known in the art or later discovered. The mirror 28 may have a flat, planar surface or a curvilinear surface. As can best be seen in FIGS. 1 and 2, the mirror 28 is held in position by the frontally extended framing and retaining lip of the mirror holder 16 surrounding and encompassing the mirror 28. The mirror holder 16 has a downwardly depending flange 30 which is formed along with, and may be considered a rigid portion of, the mirror holder 16. Mounted to the depending flange 30 is the shaft holder and support 26 previously described. At opposite sides of the depending flange 30 are alternate mounting holes 32a, b such that, if desired, the hunter may affix the combination mirror directly to a support by the use of ties, bungi cords, etc.

Depending downward from the flange 30 is a depending thin, arcuate protrusion or tab 34 positioned at the midpoint of the width and depth dimensions of the depending flange 30. Secured to and hanging downward from the tab 34 is a flexible line 36 which, in combination with the tab 34, forms the wind gauge of the present invention. The line 36 is secured to the tab 34 at a point slightly inward from the edge thereof such that the remaining length of flexible line 36 is permitted to swing freely so as to be immediately displaced by any movement of the surrounding air. The flexible line 36 has a weight and size so as to be displaceable from its rest position by any air movement. This displacement will show air movement and direction by the direction of the displacement The line 36 may be formed from absorbent material and contain a scent to camouflage the scent of the hunter or to introduce another scent into the immediate surrounding area. The scent may be applied by means of absorbing a liquid or a spray of a desired scent in liquid form.

Figure 4:
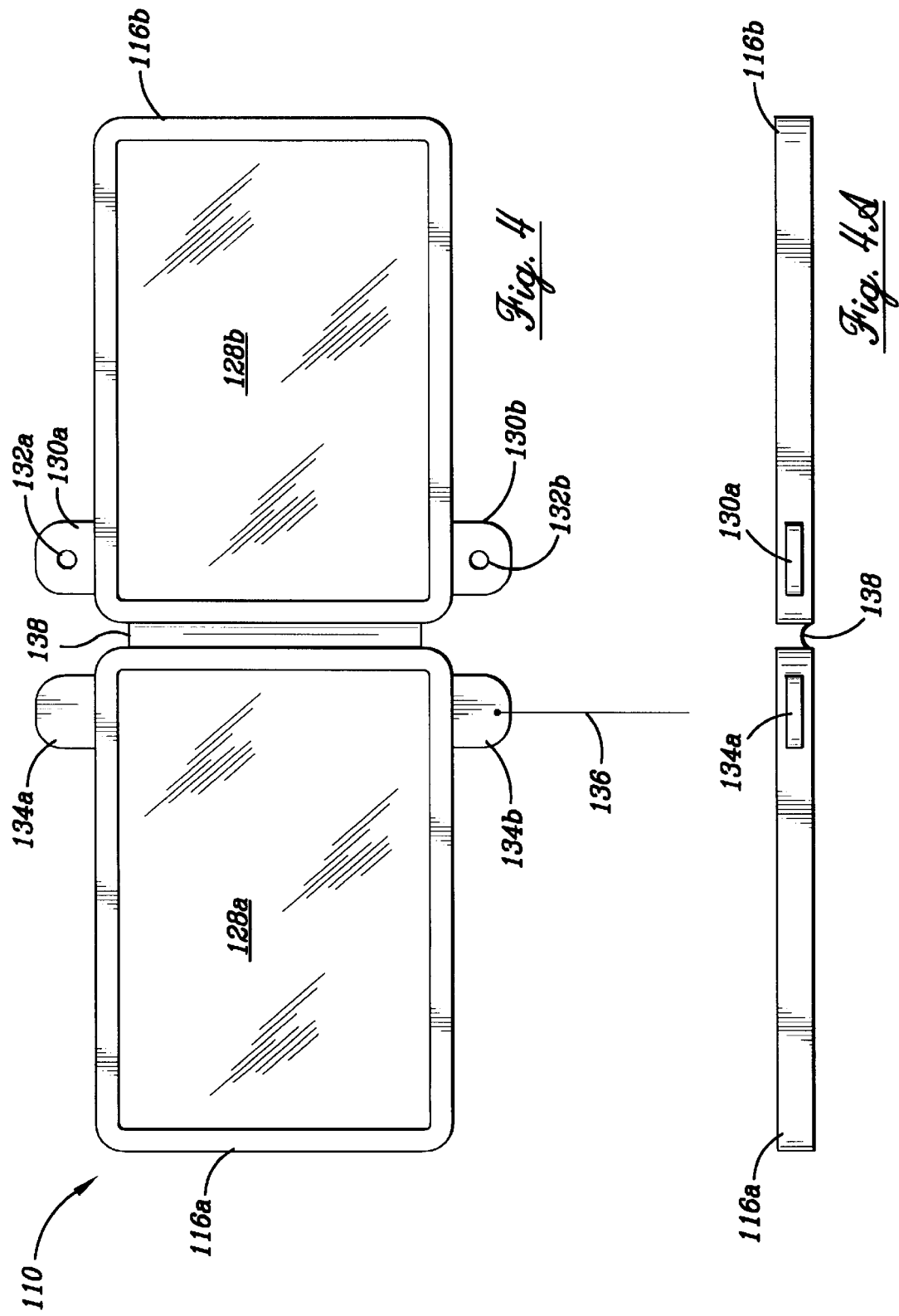
FIG. 4 is a front plan view of a second embodiment of the present invention showing bi-sectional mirrors, mirror holders and wind gauge.

A second embodiment of the present invention is shown in FIGS. 4 and 4a and may be generally described as a bi-sectional rearward field of vision mirror apparatus 110. Not shown in the referenced drawing figures are the base and elongate arm or shaft, as such elements are identical to those elements described with reference to FIG. 3. However, mounting of the shaft to the combination bi-section mirror holder 116 is slightly different than earlier described.

The combination mirror holder 116 is bi-sected into left and right sections 116a, 116b, respectively. The two mirrors 128a, 128b are disposed within a framing and retaining lip of each of the combination mirror holder sections 116a, 116b in similar fashion to that described in connection with the first embodiment of the present invention. Attached to the right section 116b are two flanges or tabs 130a, 130b which are positioned along the top and bottom edges of the mirror holder, respectively. The tabs 130a, b are located proximate to the left side of the right section 116b, each having a mounting hole 132a, 132b extending respectively therethrough. As each of the tabs 130a, 130b has a depth or thickness (as shown in FIG. 4a), the shaft, when inserted, fits snugly against the surrounding portions of the mounting holes 132a, 132b as described above. However, in connection with the second embodiment, either of the mounting holes 132a, 132b, may be used depending upon the desired positioning of the mirror apparatus 110 by the hunter.

The left section 116a has tabs 134a, 134b positioned proximate to the right edge of the mirror holder and of similar size to the tabs 130a, 130b of the right section of mirror holder 116b. However, tab 134a has no mounting hole and serves merely as a weight balancing element so that the symmetry of the overall mirror apparatus remains intact. The tab 134b serves a similar function to the protrusion or tab 34 in the first embodiment by providing a point from which the flexible wind gauge line 136 may be secured. The line 136 serves the same purpose as the previously described flexible line 36 in connection with the first embodiment by providing the hunter with an immediate response to any air motion by displacing the line 136 away from its at rest position.

Connecting the right and left sections 116a, 116b of the mirror apparatus 110 is a flexible, positionable hinge 138 which extends from a position proximate to the top edge of each of the sections to a position proximate to the bottom edge of each of the sections 116a, 116b of the mirror apparatus 110. This "living" hinge, is formed of a flexible plastic (or similar plasticized polymer) and conjoins each of the sections 116a, 16b of the mirror apparatus 110. The hinge 138 is sufficiently pliable yet exhibits material memory so that when flexed to a desired position, it will substantially maintain that position until further adjustment by the hunter. In FIG. 4a, the "living" hinge 138 has been flexed so that the mirror holder sections 116a, 116b are aligned in a straight line, but other positions are possible which are either greater or lesser than the 180° position shown in the drawing figure. Of course, other hinge types may be used to achieve the same purpose, e.g. snap-hinge with ball and concave receivers, pin-hinge, etc., all made from similar plastic materials as is the mirror holder 116a, b.

Figure 5:
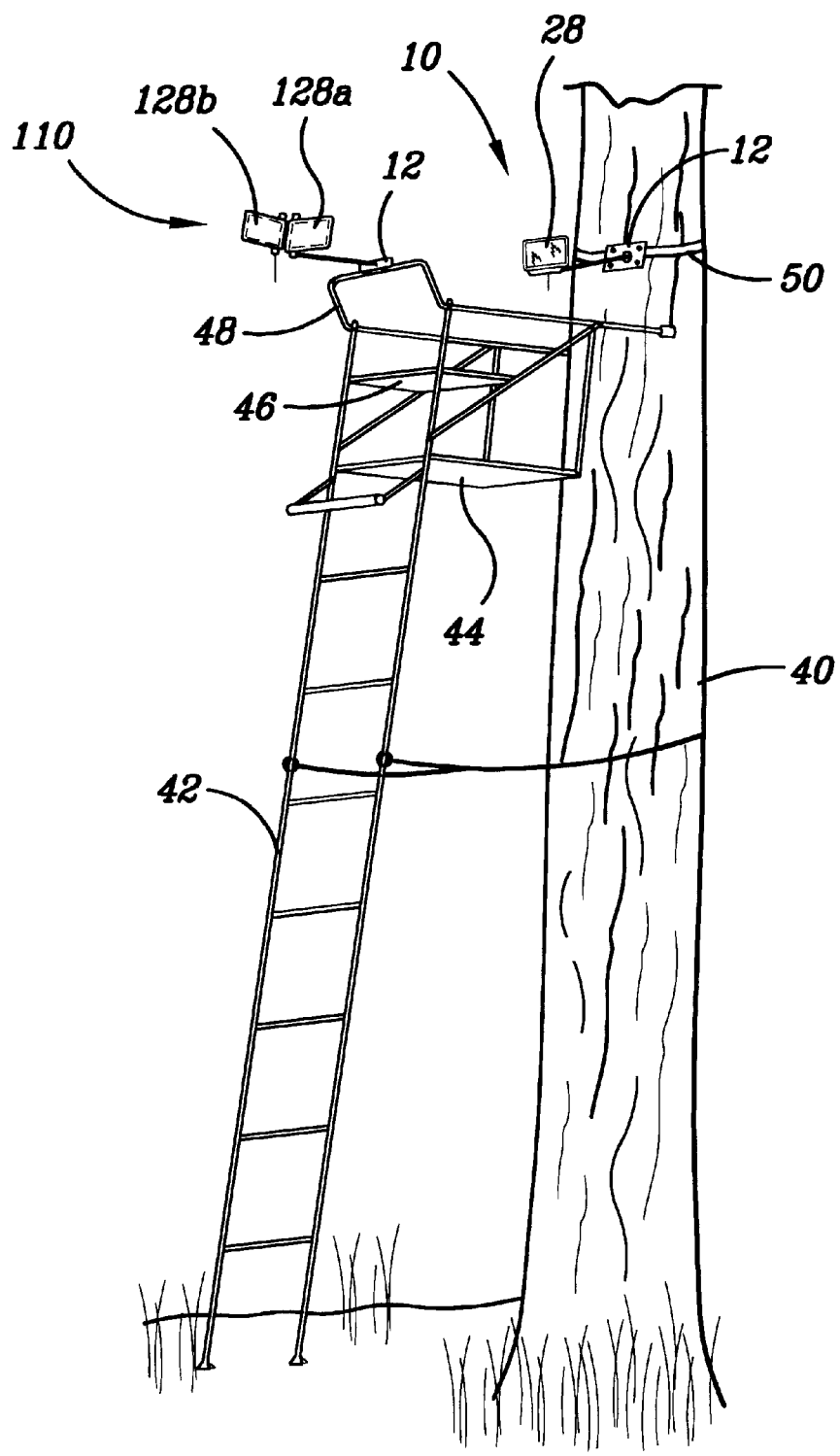
FIG. 5 is a perspective view of a hunter's tree stand positioned against a tree showing both the first and second embodiments of the present invention mounted for use by the hunter.

With reference to FIG. 5, both of the embodiments of the present invention are shown as they would be when in actual use. The first embodiment of the rearward field of vision mirror apparatus 10 is shown attached about a vertical cylindrical object, a tree 40, just above the elevated platform 44 of a hunter's tree stand 42. The mirror 28 of the rearward field of vision apparatus 10 extends outward, downward and to the left of the tree stand platform and seat 46, a sufficient distance away from the tree so that the hunter when seated in the tree stand seat 46 facing away from the tree 40, can shift his eyes to the left and view a field of vision behind and to the left of the tree 40.

The base of the rearward field of vision apparatus 10 can be secured about the tree 40 by ties, bungi cords, and the like, by utilizing the mounting holes 18a, 18c, 18e and 18g, shown more clearly in FIG. 2. Temporarily mounting the base as described securely maintains the base in direct contact with the surface of the tree 40 in the desired position selected by the hunter with little chance of self-repositioning. The securing of the base 12 about the tree 40 has been described using two ties or bungi cords, or like securing means 50, for securing the rearward field of vision apparatus 10 to the tree 40. The base 12 may also have channels on its underside through which straps may be placed to secure the base to a support surface in like manner.

Up to this point, the base 12, which is substantially rectangular in shape, has been described as being secured with the larger dimension of the rectangle in a horizontal orientation. It is also possible to orient the base with the larger dimension in a vertical orientation and secure it in place using the same corner mounting holes, 18a, 18c, 18e and 18g. Additionally, it is possible to secure the base 12 to the upstanding object or support surface by using the central mounting holes 18d and 18h for a horizontal orientation or 18b and 18f for a vertical orientation. Likewise, it is possible to secure the base 12 to the upstanding object or support surface using opposite corner mounting holes and a single securing tie, bungi cord, or like securing means 50.

Alternately, the base 12 is mountable to a differently formed surface such as a rail 48 of the tree stand as shown in FIG. 5. In this instance of mounting, the base has its larger dimension in the horizontal direction and ties would extend between corner mounting holes 18a and 18g and corner mounting holes 18c and 18e to secure the base in a relatively fixed position against the tree stand rail 48.

The bi-sectional mirror holder 116 is positioned outward from the tree stand rail 48 at the end of the elongate arm with the flexible hinge 138 positioned such that the sections 116a, 116b are not in alignment so that the relative angular displacement between the mirror 128a, 128b is greater than 0°. The respective mirrors 128a, 128b provide rearward and sideward fields of vision directly to the right of the tree 40 and also farther to the right of the tree 40, with the field of vision of the angled mirror 128b being farther outward from the tree proportionate to the difference in angular relationship between the planar surfaces of each of the mirrors 128a, 128b. In this fashion, the hunter can, with little or no motion (or even movement of the head), see a significant area to the rear and to the right rear side while sitting with his back to the obstructional vertical or upstanding object, the tree 40. It is also possible with either or both of the embodiments of the present invention to bend and position the elongate arm 14 so that the rearward field of vision may be also focused upward or downward (or right or left) of the seated position of the hunter and the respective mirror position.

It should be explained that the base 12 is constructed from a thermoplastic elastomer and will conform substantially to the shape of the underlying support surface. It should also be understood that the base 12 may be constructed in different sizes and with varying dimensions so that mounting against different support surfaces is made easier.

In connection with both embodiments of the present invention, the wind gauge which depends downward from the combination mirror holder 16, 116 provides a substantially immediate and continuous indication of air movement and direction so that the hunter is aware of the wind direction so that he can make the determination of whether the game being sought is upwind or downwind of his position. An alternate type indicator of air movement which can be used is a pinwheel type rotating detector which will show motion, but not necessarily direction, of the air movement. Although both types are contemplated for use with the present invention, the multi-purpose line 36, 136 is preferred.

Thus, with the combination of the adjustable rearward field of vision mirror apparatus 10, 110 and the wind gauge, a hunter can virtually remain motionless yet still continually monitor a significantly increased field of vision behind and to the side of the hunter's forward facing field of vision. The present embodiments of the invention may be used in other similar environments such as a tree blind, a ground blind, or merely be used in connection with a stool or seat positioned near or against an upstanding object to which the combination rear viewing apparatus may be secured.

The present invention may be useful for activities other than hunting. Nature and wildlife photographers also use a variety of blinds and stands while they await the arrival of certain selected animals, birds, etc. so that photographs of the subjects may be taken. The photographer needs to remain just as motionless as a hunter so that the intended subject of the photograph is unaware of the presence of the photographer and is not scared away by any quick motion on the part of the photographer.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A combination rearward viewing and wind gauge apparatus comprising: a base member having a plurality of mounting holes and being conformable to the shape of a substantially rigid underlying support surface, an elongated shaft for supporting a means for holding at least one mirror and a means for determining wind direction and movement, a means for retaining and supporting said elongated shaft substantially perpendicular to an outer facing surface of said base member and attached to said base member, said means for holding at least one mirror being attached in perpendicular arrangement to said elongated shaft at a distal end of said elongated shaft.

2. The combination of claim 1, wherein the elongated shaft is bendable over its entire length to selected positions with the capability to remain in said selected positions.

3. The combination of claim 1, further comprising a flexible hinge conjoining adjacent sections of said mirror holding means, each said section containing a mirror and being separately angularly adjustable.

4. The combination of claim 3, wherein said flexible hinge may be selectively positioned to align each of the faces of the mirrors in a relative angular displacement which varies over the range of 0° to 180°.

5. The combination of claim 1, wherein the means for determining wind direction and movement is a flexible line having a weight and size so as to be displaceable from its rest position by air movement showing said air movement by the direction of the displacement.

6. A combination rearward viewing and wind gauge apparatus comprising: an elongated shaft for supporting a means for holding at least one mirror and a means for determining wind direction and movement, a naturally occurring support means for retaining said elongated shaft substantially perpendicular to an outer facing surface of said naturally occurring support means, said means for holding at least one mirror being attached in perpendicular arrangement to said elongated shaft at a distal end of said elongated shaft.

7. The combination of claim 6, wherein the elongated shaft is bendable over its entire length to selected positions with the capability to remain in said selected positions.

8. The combination of claim 6, further comprising a flexible hinge conjoining adjacent sections of said mirror holding means, each said section containing a mirror and being separately angularly adjustable.

9. The combination of claim 8, wherein said flexible hinge may be selectively positioned to align each of the faces of the mirrors in a relative angular displacement which varies over the range of 0° to 180°.

10. The combination of claim 6, wherein the means for determining wind direction and movement is a flexible line having a weight and size so as to be displaceable from its rest position by air movement showing said air movement by the direction of the displacement.

* * * * *